United States Patent
Wagner et al.

(10) Patent No.: US 9,635,251 B2
(45) Date of Patent: Apr. 25, 2017

(54) VISUAL TRACKING USING PANORAMAS ON MOBILE DEVICES

(75) Inventors: Daniel Wagner, Vienna (AT); Alessandro Mulloni, Graz (AT); Dieter Schmalstieg, Graz (AT); Tobias Martin Langlotz, Graz (AT)

(73) Assignee: QUALCOMM Incorporated, San Diego, CA (US)

( * ) Notice: Subject to any disclaimer, the term of this patent is extended or adjusted under 35 U.S.C. 154(b) by 557 days.

(21) Appl. No.: 13/112,876

(22) Filed: May 20, 2011

(65) Prior Publication Data

US 2011/0285810 A1 Nov. 24, 2011

Related U.S. Application Data

(60) Provisional application No. 61/347,294, filed on May 21, 2010, provisional application No. 61/349,733, filed on May 28, 2010.

(51) Int. Cl.
*H04N 7/00* (2011.01)
*H04N 7/18* (2006.01)
*H04N 5/232* (2006.01)

(52) U.S. Cl.
CPC ............................. *H04N 5/23238* (2013.01)

(58) Field of Classification Search
CPC ................................................. H04N 5/23238
USPC ..................................................... 348/36, 37
See application file for complete search history.

(56) References Cited

U.S. PATENT DOCUMENTS

| | | | |
|---|---|---|---|
| 6,356,297 B1 | 3/2002 | Cheng et al. | |
| 6,563,529 B1 | 5/2003 | Jongerius | |
| 6,657,667 B1 | 12/2003 | Anderson | |
| 7,035,760 B2 | 4/2006 | Kobayashi et al. | |
| 7,082,572 B2 | 7/2006 | Pea et al. | |

(Continued)

OTHER PUBLICATIONS

B. H. Thomas, V. Demczuk, W. Piekarski, D. Hepworth, and B. Gunther. A wearable computer system with augmented reality to support terrestrial navigation. In Proc. ISWC'98, pp. 168-171, Pittsburgh, PA, USA, Oct. 19-20, 1998.

(Continued)

*Primary Examiner* — Dave Czekaj
*Assistant Examiner* — Tison B Owens
(74) *Attorney, Agent, or Firm* — Shyam Parekh; Michael Kramer (57) ABSTRACT

A mobile platform maps and tracks the orientation of the mobile platform in real-time as the mobile platform rotates. The mobile platform captures a plurality of camera images as the camera rotates and projects the plurality of camera images consecutively to a panoramic cylindrical map. The map is extended by projecting areas of any camera image that correspond to unmapped portions of the panoramic cylindrical map. Keypoints are extracted from mapped portions of the map and using the keypoints the orientation of the camera is determined. Accumulated error is removed when closing the panoramic cylindrical map by extending the map horizontally beyond 360 degrees to produce overlapping regions and extracting and matching keypoints from the overlapping regions. Additionally, an incorrect estimate of the initial orientation of the map may be corrected by determining the correct orientation and re-projecting the map onto a map with the correct orientation.

35 Claims, 7 Drawing Sheets

(56) References Cited

U.S. PATENT DOCUMENTS

| | | | |
|---|---|---|---|
| 7,126,630 | B1 | 10/2006 | Lee et al. |
| 7,508,977 | B2 | 3/2009 | Lyons et al. |
| 7,522,186 | B2* | 4/2009 | Arpa et al. ............... 348/153 |
| 7,630,571 | B2 | 12/2009 | Cutler et al. |
| 7,752,008 | B2 | 7/2010 | Satoh et al. |
| 7,966,563 | B2 | 6/2011 | Bree et al. |
| 7,999,842 | B1 | 8/2011 | Barrus et al. |
| 8,411,091 | B2 | 4/2013 | Horri et al. |
| 2001/0010546 | A1* | 8/2001 | Chen ........................ 348/218 |
| 2003/0035047 | A1* | 2/2003 | Katayama et al. .......... 348/47 |
| 2003/0063133 | A1 | 4/2003 | Foote et al. |
| 2003/0091226 | A1 | 5/2003 | Cahill et al. |
| 2005/0190972 | A1 | 9/2005 | Thomas et al. |
| 2006/0023075 | A1 | 2/2006 | Cutler |
| 2007/0025723 | A1 | 2/2007 | Baudisch et al. |
| 2007/0109398 | A1* | 5/2007 | Teo ............................ 348/36 |
| 2007/0200926 | A1 | 8/2007 | Chianglin |
| 2008/0106594 | A1 | 5/2008 | Thrun |
| 2009/0086022 | A1 | 4/2009 | Finn et al. |
| 2009/0110241 | A1 | 4/2009 | Takemoto et al. |
| 2009/0179895 | A1 | 7/2009 | Zhu et al. |
| 2009/0316951 | A1 | 12/2009 | Soderstrom |
| 2010/0026714 | A1 | 2/2010 | Utagawa |
| 2010/0111429 | A1 | 5/2010 | Wang et al. |
| 2010/0208032 | A1* | 8/2010 | Kweon ....................... 348/36 |
| 2010/0302347 | A1 | 12/2010 | Shikata |
| 2011/0234750 | A1 | 9/2011 | Lai et al. |
| 2011/0285811 | A1 | 11/2011 | Langlotz et al. |
| 2011/0292166 | A1 | 12/2011 | Schall et al. |

OTHER PUBLICATIONS

B. Hoff and R. Azuma. Autocalibration of an electronic compass in an outdoor augmented reality system. In Proc. ISAR 2000, pp. 159-164, 2000.

G. Reitmayr and T. W. Drummond. Going out: Robust tracking for outdoor augmented reality. In Proc. ISMAR 2006, pp. 109-118, Santa Barbara, CA, USA, Oct. 22-25, 2006.

G. Reitmayr and T. W. Drummond. Initialisation for visual tracking in urban environments. In Proc. ISMAR 2007, pp. 161-160, Nara, Japan, Nov. 13-16, 2007.

G. Schall, D. Wagner, G. Reitmayr, E. Taichmann, M. Wieser, D. Schmalstieg, and B. Hofmann-Wellenhof. Global pose estimation using multi-sensor fusion for outdoor augmented reality. In Proc. ISMAR 2009, pp. 153-162, Orlando, Florida, USA, 2009.

Kiyohide Satoh, Mahoro Anabuki, Hiroyuki Yamamoto, Hideyuki Tamura, "A Hybrid Registration Method for Outdoor Augmented Reality," isar, pp. 67, IEEE and ACM International Symposium on Augmented Reality (ISAR'01), 2001.

M. Ribo, P. Lang, H. Ganster, M. Brandner, C. Stock, and A. Pinz. Hybrid tracking for outdoor augmented reality applications. IEEE Comp. Graph. Appl., 22(6):54-63, 2002.

R. Azuma, B. Hoff, H. Neely, and R. Sarfaty. A motion-stabilized outdoor augmented reality system. In Proc. IEEE VR, pp. 252-259, Houston, Texas, USA, 1999.

R. Azuma, J. W. Lee, B. Jiang, J. Park, S. You, and U. Neumann. Tracking in unprepared environments for augmented reality systems. Computer & Graphics, 23(6):787-793, 1999.

Reinhold Behringer, "Registration for Outdoor Augmented Reality Applications Using Computer Vision Techniques and Hybrid Sensors," vr, pp. 244, IEEE Virtual Reality Conference 1999 (VR '99), 1999.

S. You, U. Neumann, and R. Azuma. Hybrid inertial and vision tracking for augmented reality registration. In Proc. VR 1999, pp. 260-267, Houston, Texas, USA, Mar. 13-17, 1999.

Schall, G. et.al., "North-Centred Orientation Tracking on Mobile Phones", Mixed and Augmented Reality (ISMAR), 2010 9th IEEE InternationalSymposium, p. 267, Oct. 13-16, 2010.

Schmalstieg, et al., "Augmented Reality 2.0" Virtual Realities, Springer Vienna, 2011.

Suya You, Ulrich Neumann, and Ronald Azuma. 1999. Orientation Tracking for Outdoor Augmented Reality Registration. IEEE Comput. Graph. Appl. 19, 6 (Nov. 1999), 36-42. DOI=10.1109/38.799738 http://dx.doi.org/10.1109/38.799738.

Wagner, D. et al., "Real-time Panoramic Mapping and Tracking on Mobile Phones", Virtual Reality Conference (VR), 2010 IEEE Issue Date: Mar. 20-24, 2010, pp. 211-218.

X. Hu, Y. Liu, Y.Wang, Y. Hu, and D. Yan. Autocalibration of an electronic compass for augmented reality. In Proc. ISMAR 2005), pp. 182-183, Washington, DC, USA, 2005.

X. Zhang and L. Gao. A novel auto-calibration method of the vector magnetometer. In Proc. Electronic Measurement Instruments, ICEMI '09, vol. 1, pp. 145-150, Aug. 2009.

Y. Baillot, S. J. Julier, D. Brown, and M. A. Livingston. A tracker alignment framework for augmented reality. In Proc. ISMAR 2003, pp. 142-150, Tokyo, Japan, Oct. 7-10, 2003.

You, S. et.al., "Fusion of Vision and Gyro Tracking for Robust Augmented Reality Registration", Virtual Reality, 2001, Proceedings. IEEE Publication pp. 71-78, Mar. 17, 2001.

* cited by examiner

VISUAL TRACKING USING PANORAMAS ON MOBILE DEVICES

CROSS-REFERENCE TO PENDING PROVISIONAL APPLICATION

This application claims priority under 35 USC 119 to U.S. Provisional Application No. 61/347,294, filed May 21, 2010, and entitled "Visual Tracking Using Panoramas on Mobile Devices" and to U.S. Provisional Application No. 61/349,733, filed May 28, 2010, and entitled "Online Creation of Panoramic Augmented Reality Annotations on Mobile Platforms" both of which are assigned to the assignee hereof and are incorporated herein by reference.

BACKGROUND

Tracking for outdoor Augmented Reality (AR) applications has very demanding requirements: It must deliver an accurate registration with respect to a given coordinate system, be robust and run in real time. Despite recent improvements, tracking still remains a difficult problem, particularly outdoors. Recently, mobile platforms, such as mobile phones, tablets, etc., have become increasingly attractive for AR. With the built-in camera as the primary sensor, phones facilitate intuitive point-and-shoot interaction with the environment.

Most outdoor tracking systems rely on inertial sensors to improve robustness. Even though some modern smart phones integrate a linear accelerometer, it is of little help in typical AR scenarios since it only delivers translational motion. Instead, most successful approaches rely on gyroscope sensors that measure rotations, which are primary sources for tracking instabilities.

A panoramic tracker may be used for tracking a mobile platform's orientation. The panoramic tracker may be integrated, e.g., into a system with sensors, such as satellite positioning systems, compasses linear accelerometers and gyroscopes to improve the system's robustness.

A panoramic tracker requires the generation of a panoramic map that is compared to a current image captured by the mobile platform to track the orientation of the mobile platform with respect to the map. Most existing approaches to panorama creation involve an offline process, which is undesirable. While real-time approaches to panorama creation exist, they suffer from problems such as high computational costs that render the approaches unsuitable for use with mobile platforms with limited processing power. Accordingly, improvements for creating panoramic content are desired.

SUMMARY

A mobile platform maps and tracks the orientation of the mobile platform in real-time as the mobile platform rotates. The mobile platform captures a plurality of camera images as the camera rotates and projects the plurality of camera images consecutively to a panoramic cylindrical map. The map is extended by projecting areas of any camera image that correspond to unmapped portions of the panoramic cylindrical map. Keypoints are extracted from mapped portions of the map and using the keypoints the orientation of the camera is determined. Accumulated error is removed when closing the panoramic cylindrical map by extending the map horizontally beyond 360 degrees to produce overlapping regions and extracting and matching keypoints from the overlapping regions. Additionally, an incorrect estimate of the initial orientation of the map may be corrected by determining the correct orientation and re-projecting the map onto a map with the correct orientation.

In one aspect, a method includes capturing a plurality of camera images from a camera as the camera rotates and projecting the plurality of camera images consecutively to a panoramic cylindrical map, wherein the panoramic cylindrical map is extended by projecting areas of any camera image that correspond to unmapped portions of the panoramic cylindrical map. Keypoints are extracted from mapped portions of the panoramic cylindrical map and used to determine an orientation of the camera.

In another aspect, an apparatus comprises a camera, a processor connected to receive data from the camera, a memory connected to the processor, and software held in the memory and run in the processor. The software causes the processor to consecutively project a plurality of camera images captured by the camera as the camera rotates onto a panoramic cylindrical map, wherein the panoramic cylindrical map is extended by projecting areas of any camera image that correspond to unmapped portions of the panoramic cylindrical map, extract keypoints from mapped portions of the panoramic cylindrical map, and use the keypoints to determine an orientation of the camera.

In another aspect, a system includes a means for capturing a plurality of camera images from a rotating position and a means for projecting the plurality of camera images consecutively to a panoramic cylindrical map, wherein the panoramic cylindrical map is extended by projecting areas of any camera image that correspond to unmapped portions of the panoramic cylindrical map. Additionally, the system includes means for extracting keypoints from mapped portions of the panoramic cylindrical map and means for using the keypoints to determine an orientation of the camera.

In yet another aspect, a computer-readable medium including program code stored thereon comprising program code to consecutively project a plurality of camera images captured by a camera as the camera rotates onto a panoramic cylindrical map, wherein the panoramic cylindrical map is extended by projecting areas of any camera image that correspond to unmapped portions of the panoramic cylindrical map. The computer-readable medium further includes program code to extract keypoints from mapped portions of the panoramic cylindrical map and program code to use the keypoints to determine an orientation of the camera.

DETAILED DESCRIPTION

Figure 1A:
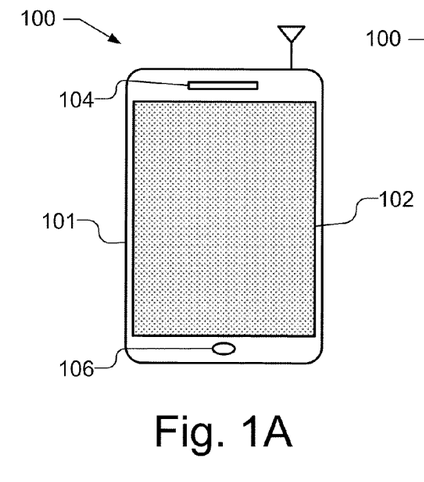
FIGS. 1A and 1B illustrate a front side and back side, respectively, of a mobile platform capable of real-time panoramic mapping and tracking.
Figure 1B:
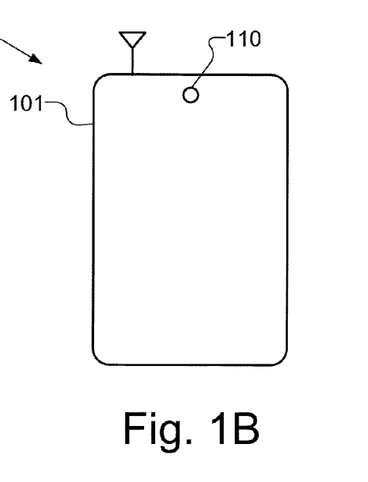

FIGS. 1A and 1B illustrate a front side and back side, respectively, of a mobile platform 100, capable of real-time panoramic mapping and tracking. The mobile platform 100 is illustrated as including a housing 101, a display 102, which may be a touch screen display, as well as a speaker 104 and microphone 106. The mobile platform 100 further includes a forward facing camera 110 to image the environment. Assuming pure rotational movements, the mobile platform 100 creates a panoramic map from the live image stream from camera 110. For each camera image, i.e., video frame or captured image, the mobile platform 100 pose is updated—based on the existing data in the map—and the map is extended by only projecting areas that have not yet been stored. A dense map of the environment map is thus created without multiple of refinements, which provides accurate, robust and drift-free tracking.

As used herein, a mobile platform refers to any portable electronic device such as a cellular or other wireless communication device, personal communication system (PCS) device, personal navigation device (PND), Personal Information Manager (PIM), Personal Digital Assistant (PDA), or other suitable mobile device. The mobile platform may be capable of receiving wireless communication and/or navigation signals, such as navigation positioning signals. The term "mobile platform" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile platform" is intended to include all electronic devices, including wireless communication devices, computers, laptops, tablet computers, etc. which are capable of AR.

Figure 2:
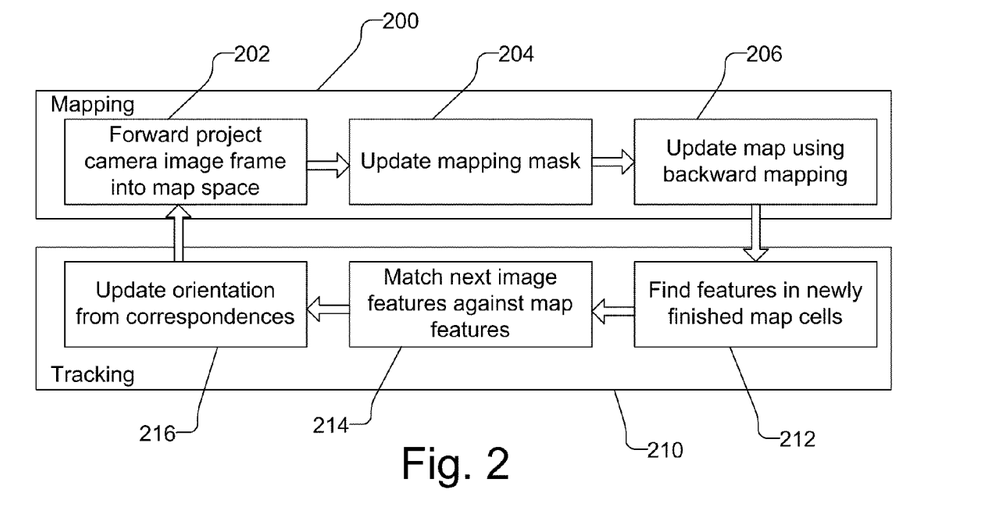
FIG. 2 illustrates a flow chart of the panorama mapping process and the tracking process utilized by mobile platform.

FIG. 2 illustrates a flow chart of the panorama mapping process 200 and the tracking process 210 utilized by mobile platform 100. Tracking requires a map for estimating the orientation, whereas mapping requires an orientation for updating the map. A known starting orientation with a sufficient number of natural features in view may be used to initialize the map. As illustrated, the current camera image frame is forward projected into the panoramic map space (202). A mapping mask is updated (204) and the map is updated using backward mapping (206). Features are found in the newly finished cells of the map (212). The map features are matched against features extracted from the next camera image (214) and based on correspondences, the orientation of the mobile platform is updated (216).

A cylindrical map is used for panoramic mapping as a cylindrical map can be trivially unwrapped to a single texture with a single discontinuity on the left and right borders. The horizontal axis does not suffer from nonlinearities; however, the map becomes more compressed at the top and the bottom. The cylindrical map is not closed vertically and thus there is a limit to the pitch angles that can be mapped. This pitch angel limit, however, is acceptable for practical use as a map of the sky and ground is typically not used for tracking.

The dimensions of the cylindrical map may be set as desired. For example, with the cylindrical map's radius fixed to 1 and the height to $\pi/2$, the map that is created by unwrapping the cylinder is four times as wide as high ($\pi/2$ high and $2\pi$ wide). A power of two for the aspect ratio simplifies using the map for texturing. The map covers 360° horizontally while the range covered vertically is given by the arctangent of the cylinder's half-height ($\pi/4$), therefore [−38.15°, 38.15°]. Of course, other ranges may be used if desired.

Current mobile phones can produce multi-megapixel photos, but the live video feed is typically restricted, e.g., to 320×240 pixels. Moreover, a typical camera on a mobile phone has roughly a 60° horizontal field of view. Accordingly, if the mobile platform 100 is a current mobile phone, a complete 360° horizontal panorama would be approximately 1920 pixels wide (=320 pixels/60°·360°). Thus, the resolution of the cylindrical map may be chosen to be, e.g., 2048×512 pixels, which is the smallest power of two that is larger than the camera's resolution thereby permitting the transfer of image data from the camera into the map space without loss in image quality. To increase tracking robustness lower-resolution maps (1024×256 and 512×128) may also be created as discussed below.

Figure 3:
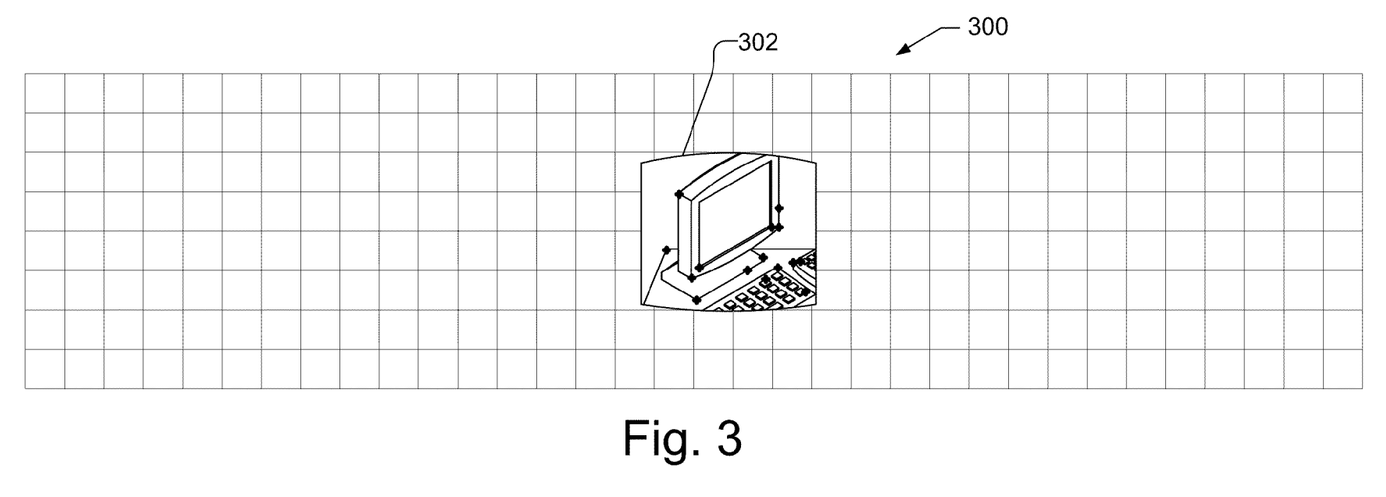
FIG. 3 illustrates an unwrapped cylindrical map that is split into a regular grid of cells and includes a first camera image frame projected and filled on the map.

FIG. 3 illustrates an unwrapped cylindrical map 300 that is split into a regular grid, e.g., of 32×8 cells. Every cell in the map 300 has one of two states: either unfinished (empty or partially filled with mapped pixels) or finished (completely filled). When a cell is finished, it is down-sampled from the full resolution to the lower levels and keypoints are extracted for tracking purposes. FIG. 3 illustrates a first camera image frame 302 projected and filled on the map 300. The crosses in the first camera image frame 302 mark keypoints that are extracted from the image. Keypoints may be extracted from finished cells using the FAST (Features from Accelerated Segment Test) corner detector. Of course, other methods for extracting keypoints may be used, such as Scale Invariant Feature Transform (SIFT), or Speeded-up Robust Features (SURF), or any other desired method.

Of course, because the cylindrical map is filled by projecting pixel data from the camera image onto the map, the intrinsic and extrinsic camera parameters should calibrated for an accurate mapping process. Assuming that the camera 110 does not change zoom or focus, the intrinsic parameters can be estimated once using an off-line process and stored for later use. For example, the principle point and the focal lengths for the camera 110 in the x and y directions are estimated. Cameras in current mobile phones internally typically correct most of the radial distortion introduced by the lens of the camera. However, some distortion may remain, so additional correction may be useful. To measure such distortion parameters, an image of a calibration pattern may be taken and evaluated with known camera calibration processes, such as the Caltech camera calibration toolbox. Additional corrections may be performed, such as correcting artifacts due to vignetting, which consists of a reduction in pixel intensities at the image periphery. Vignetting can be modeled with a non-linear radial falloff, where the vignette strength is estimated by taking a picture of a diffusely-lit white board. The average intensities close to all the four corners are measured and the difference from the image center is noted.

Figure 4A:
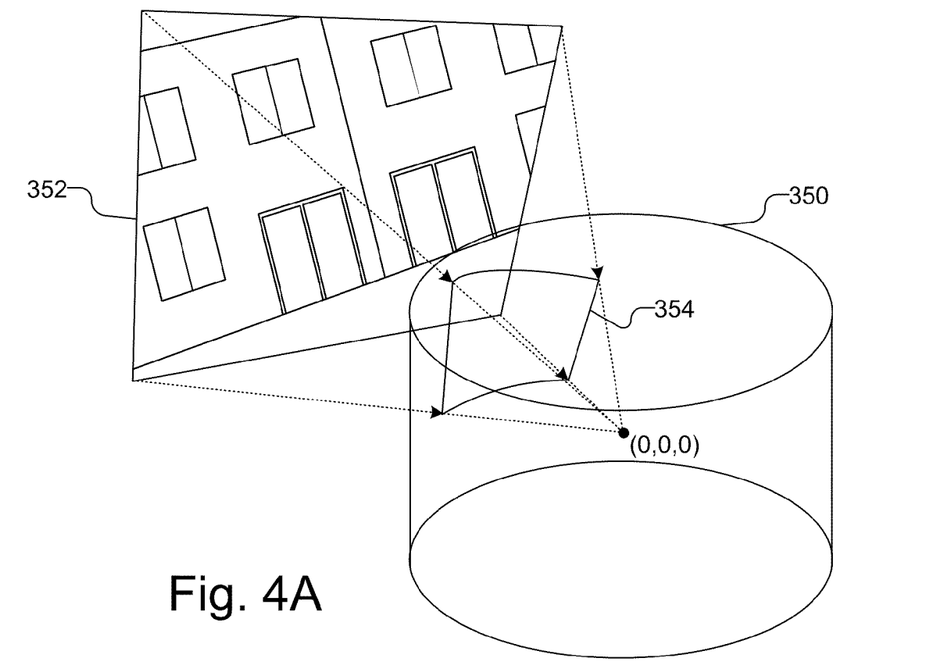
FIG. 4A illustrates a wrapped cylindrical map with the position of the mobile platform set at the origin and shows a frame of a camera image forward projected onto the cylindrical map.

Referring back to FIG. 2, the current camera image is projected into the panoramic map space (202). Projecting the current camera image onto a cylindrical map assumes pure rotational motion of the mobile platform 100, which is particularly valid where distance between the mobile platform 100 and the objects in the environment is large compared to any involuntary translational motion that occurs when rotating the mobile platform 100 and, therefore, errors are negligible. Moreover, a user may be trained to effectively minimize parallax errors. The mobile platform 100 position may be set to the origin O (0,0,0) at the center of the mapping cylinder. FIG. 4A, by way of example, illustrates a wrapped cylindrical map 350 with the position of the mobile platform 100 set at the origin O (0,0,0) and shows a frame 354 of a camera image 352 projected onto a cylindrical map 350. A fixed camera position leaves 3 rotational degrees of freedom to estimate for correctly projecting camera images onto the cylindrical map 350. Depending on the availability of motion sensors, such as accelerometers, in the mobile platform 100, the system may be either initialized from the measured roll and pitch angles of the mobile platform a roughly horizontal orientation may be assumed. The effects of starting with an incorrect orientation may be corrected during the mapping process as described below.

Given a known (or assumed) camera orientation O, forward mapping is used to estimate the area of the surface of the cylindrical map 350 that is covered by the current camera image. Given a pixel's device coordinate P, i.e., the coordinates in the image sensor, a 3D ray R is calculated as follows:

$$R=\pi'(\delta'(K^{-1}\Box P))$$ eq. 1

The pixel's device coordinate P is transformed into an ideal coordinate by multiplying it with the inverse of the camera matrix K and removing radial distortion using a function $\delta'$. The resulting coordinate is then unprojected into the 3D ray R using the function $\pi'$ by adding a z-coordinate of 1. The ray R is converted into a 2D map position M as follows:

$$M=\mu(\iota(O^{-1}\Box R,C))$$ eq. 2

The 3D ray R is rotated from map space into object space using the inverse of the camera rotation matrix $O^{-1}$. Next, the ray is intersected with the cylinder using a function t to get the pixel's 3D position on the cylindrical map 350. Finally, the 3D position is converted into the 2D map position M using a function $\mu$, which converts a 3D position into a 2D map, i.e., converting the vector to a polar representation.

A rectangle defined by the corners of the frame of the camera image 352 is forward mapped onto the cylindrical map 350, as illustrated in FIG. 4A and discussed above. The first camera image may be forward mapped to the center of the cylindrical map, as illustrated in FIG. 3. Each subsequent camera image is aligned to the map by extracting and matching features from the camera image and the map as discussed in step 214. Once the position of the camera image on the map is determined, a frame for the camera image, e.g., frame 354 in FIG. 4A, is projected onto the cylindrical map. The frame 354 defines a mask for the pixels of the map 350 that are covered by the current camera image 352. Due to radial distortion and the nonlinearity of the mapping, each side of the rectangular frame 354 may be sub-divided three times to obtain a smooth curve in the space of the cylindrical map 350.

Figure 4B:
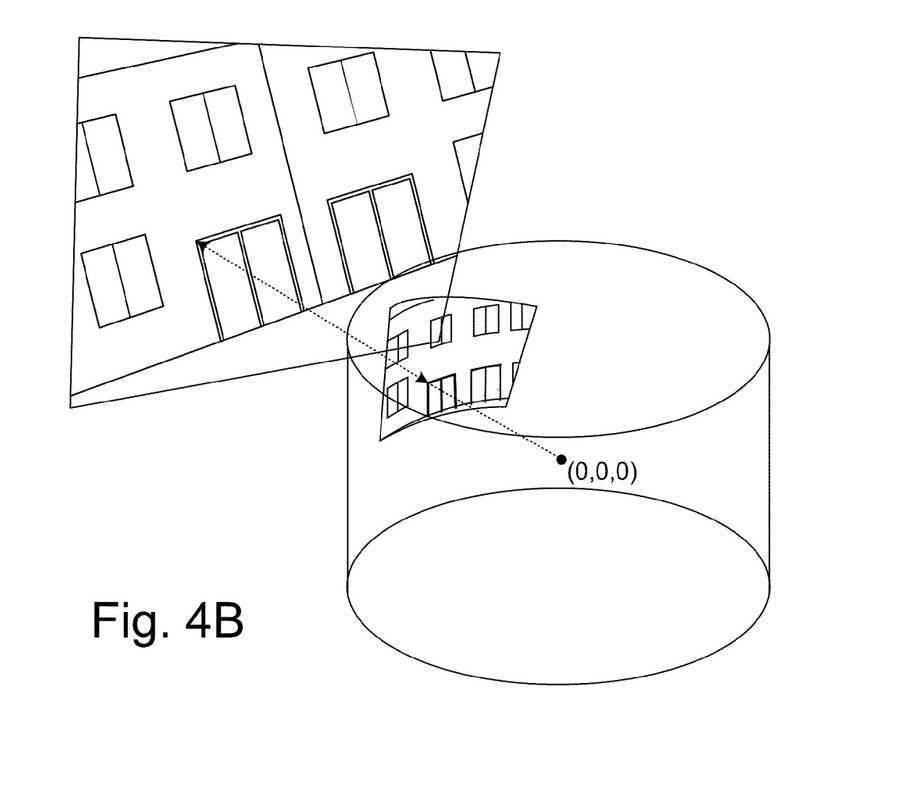
FIG. 4B illustrates the wrapped cylindrical map of FIG. 4A with the frame of the camera image filled using backward projection.

The forward-mapped frame 354 provides an almost pixel-accurate mask for the pixels that the current image can contribute. However, using forward mapping to fill the map with pixels can cause holes or overdrawing of pixels. Thus, the map is filled using backward mapping (step 206 in FIG. 2), as illustrated in FIG. 4B, which shows the wrapped cylindrical map 350 with the frame 354 filled with pixels from the camera image 352. Backward mapping starts with the 2D map position M' on the cylinder map and produces a 3D ray R' as follows:

$$R'=O*\mu'(M')$$ eq. 3

As can be seen in equation 3, a ray is calculated from the center of the camera using function $\mu'$, and then rotating the using the orientation O, resulting in ray R'. The ray R' is converted in to device coordinates P' as follows:

$$P'=K*\delta(\pi(R'))$$ eq. 4

The ray R' is projected onto the plane of the camera image 352 using the function $\pi$, and the radial distortion is applied using function $\delta$, which may be any known radiation distortion model. The resulting ideal coordinate is converted into a device coordinate P' via the camera matrix K. The resulting coordinates typically lies somewhere between pixels, so linear interpolation is used to achieve a sub-pixel accurate color. Finally, vignetting may be compensated and the pixel color is stored in cylindrical map.

A single 320×240 pixel camera image will require back projecting roughly 75,000 pixels, which is too great a workload for typical current mobile platforms. To increase the speed of the process, each pixel in the cylindrical map 350 may be set only a limited number of times, e.g., no more than five times, so that backward mapping occurs a limited number of times for each pixel. For example, in one embodiment, each pixel may be set only once, when it is backward mapped for the first time. Thus, when panoramic mapping is initiated, the first camera image requires a large number of pixels to be mapped to the cylindrical map. For example, as illustrated in FIG. 3, the entire first camera image frame 302 is mapped onto cylindrical map 300. For all subsequent camera images, however, fewer pixels are mapped. For example, with slow camera movement, only a few rows or columns of pixels will change per camera image. By mapping only unmapped portions of the cylindrical map, the required computational power for updating the map is significantly reduced. By way of example, a camera (with a resolution of 320×240 pixels and a field of view of 60°) that is horizontally rotating by 90° in 2 seconds will produce only approximately 16 pixel columns—or 3840 pixels—to be mapped per frame, which is only 5% of an entire camera image.

To limit setting each pixel in the cylindrical map 350 only a number of times, e.g., once, a mapping mask is updated and used with each camera image (step 204 in FIG. 2). The mapping mask is used to filter out pixels that fall inside the projected camera image frame but that have already been mapped. The use of a simple mask with one entry per pixel would be sufficient, but would be slow and memory intensive. A run-length encoded (RLE) mask may be used to store zero or more spans per row that define which pixels of the row are mapped and which are not. A span is a compact representation that only stores its left and right coordinates. Spans are highly efficient for Boolean operations, which can be quickly executed by simply comparing the left and right coordinates of two spans. If desired, the mapping mask may be used to identify pixels that have been written more than five times, thereby excluding those pixels for additional writing. For example, the mapping mask may retain a count of the number of writes per pixel until the number of writes is exceeded. Alternatively, multiple masks may be used, e.g., the current mapping mask and the previous four mapping masks. The multiple masks may be overlaid to identify pixels that have been written more than five times. Each time a pixel value is written (if more than once but less than five), the projected pixel values each may be statistically combined, e.g., averaged, or alternatively, only pixel values that provide a desired quality mapping may be retained.

Figure 5:
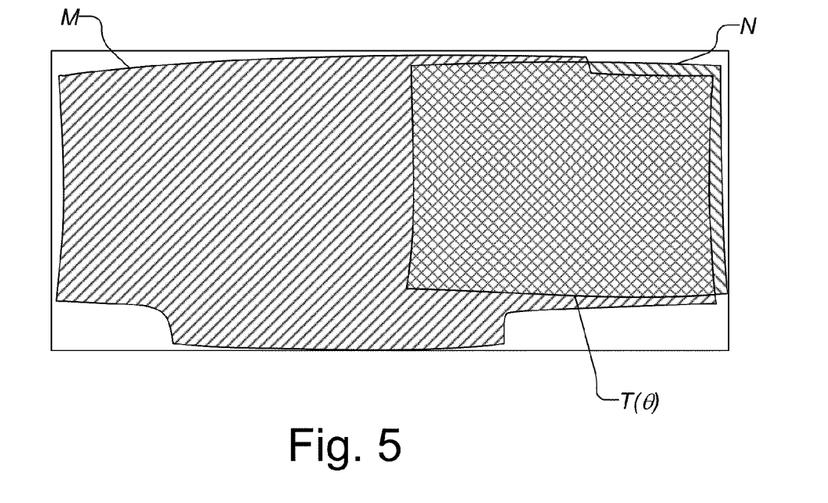
FIG. 5 illustrates a map mask that may be created during rotation of the mobile platform.

FIG. 5 illustrates a map mask M that may be created, e.g., during rotation of the mobile platform 100 to the right. The map mask M may be defined for the cylindrical map 350 at its highest resolution. Initially the map mask M is empty. For every camera image, the projected camera image frame is rasterized into spans creating a temporary mask $T(\theta)$ that describes which pixels can be mapped with the current orientation $\theta$ of the mobile platform 100. The temporary camera mask $T(\theta)$ and the map mask M are combined using a row-wise Boolean operation, such as the following:

$$N = T(\theta) \text{ANDNOT } M \qquad \text{eq. 5}$$

The resulting mask N contains locations for only those pixel that are set in the camera mask $T(\theta)$ but are not in the map mask M. Hence, mask N describes those pixels in the map 350 that will be filled by the current camera image. The map mask M is updated to include the new pixels using the following operation:

$$M = T(\theta) \text{OR } M \qquad \text{eq. 6}$$

The pixels covered by the mask N are back projected and the resulting color values are written into the map, as discussed above. Additionally, as discussed above, the cylindrical map is subdivided into cells. While filling the cylindrical map, the cells that are updated during the current camera image frame are noted. When the mapping process for a camera image frame is finished, each updated cell is checked to determine if the cell has been completely filled. For each updated cell $C_i$ a mask $U(C_i)$ is defined containing only the area of such a cell. The updated cell mask $U(C_i)$ is then intersected with mask M as follows:

$$F_i = U(C_i) \text{AND } M \qquad \text{eq. 7}$$

If the combined mask $F_i$ in equation 7 covers the entire area of the cell $C_i$, then the cell has been completely filled and can be marked as finished. A finished cell is down sampled to the smaller map levels and keypoints are extracted for tracking.

The mapping process 200 assumes an accurate estimate of the orientation of the mobile platform 100. Once the panoramic map is filled in step 206, the orientation of the mobile platform 100 can be determined using the tracking process 210. As illustrated in FIG. 2, once the panoramic map is filled in step 206, features are found in the newly finished cells in step 212. The keypoint features are extracted from finished cells using the FAST corner detector or other feature extraction techniques, such as SIFT, SURF, or any other desired method. For every keypoint, FAST provides a score of how strong the corner appears. Thresholds are adjusted for the keypoint scores according to the resolution of the map to which the cell belongs as detailed in Table 1.

TABLE 1

| Cell Size in Pixels | FAST Threshold | Max Keypoints per Cell |
|---|---|---|
| 64 × 64 | 12 | 40 |
| 32 × 32 | 9 | 20 |
| 16 × 16 | 9 | 15 |

Thus, for example, for cells from the highest resolution map (64×64 pixels in size), a FAST threshold of 12 is used. For cells from lower resolution maps, lower thresholds are used, to consider the smoothing due to down sampling. These threshold values are chosen deliberately low to ensure that an adequate number of keypoints are extracted. The keypoints are sorted by corner strength and only the strongest keypoints are retained, e.g., for a cell with 64×64-pixels, 40 keypoints are retained. Of course, other values of thresholds or maximum keypoints per cell may be used if desired.

The keypoints are organized on a cell-level because it is more efficient to extract keypoints in a single run once an area of a certain size is finished. Moreover, extracting keypoints from finished cells avoids problems associated with looking for keypoints close to areas that have not yet been finished, i.e., because each cell is treated as a separate image, the corner detector itself takes care to respect the cell's border. Finally, organizing keypoints by cells provides an efficient method to determine which keypoints to match during tracking.

With the features in the map extracted (step 212 in FIG. 2), the map features are matched against features extracted from the next camera image (step 214). An active-search procedure based on a motion model may be applied to track keypoints from one camera image to the following camera image. Keypoints in the next camera image are extracted and compared against keypoints in the map that were extracted in step 212. Accordingly, unlike other tracking methods, this tracking approach is generally drift-free. However, errors in the mapping process may accumulate so that the map is not 100% accurate. For example, a map that is created by rotating a mobile platform 100 by a given angle $\alpha$ may not be mapped exactly to the same angle $\alpha$ in the database, but rather to an angle $\alpha+\delta$. However, once the map is built, tracking is as accurate as the map that has been created.

To estimate the current camera orientation, the tracker initially uses a rough estimate. In the first camera image, the rough estimate corresponds to the orientation used for initializing the system. For all successive camera images, a motion model is used with constant velocity to estimate an orientation. The velocity is calculated as the difference in orientation between one camera image and the next camera image. In other words, the initial estimate of orientation for a camera image that will be produced at time t+1 is produced by comparing the current camera image from time t to immediately preceding camera image from time t−1.

Based on the initial rough estimate orientation, a camera image is forward projected onto the cylindrical map to find finished cells in the map that are within the frame of the camera image. The keypoints of these finished cells are then back projected onto the camera image. Any keypoints that are back projected outside the camera image are filtered out. Warped patches, e.g., 8×8 pixel, are generated for each map keypoint by affinely warping the map area around the keypoint using the current orientation matrix. The warped patches represent the support areas for the keypoints as they should appear in the current camera image. The tracker uses normalized cross correlation (over a search area) at the expected keypoint locations in the camera image. Template matching is slow and, thus, it is important to limit the size of the search area. A multi-scale approach is applied to track keypoints over long distances while keeping the search area small. For example, the first search is at the lowest resolution of the map (512×128 pixels) against a camera image that has been down-sampled to quarter size (80×60 pixels) using a search radius of 5 pixels. The coordinate with the best matching score is then refined to sub-pixel accuracy by fitting a 2D quadratic term to the matching scores of the 3×3 neighborhood. Because all three degrees of freedom of the camera are respected while producing the warped patches, the template matching works for arbitrary camera orientations. The position of the camera image with respect to the map is thus refined and the camera image is forward projected into map space (step 202 in FIG. 2) as discussed above.

Moreover, based on the refined position of the camera image, the orientation of the mobile platform is then updated (step 216 in FIG. 2). The correspondences between the 3D cylinder coordinates and the 2D camera coordinates are used in a non-linear refinement process with the initial orientation guess as a starting point. The refinement may use Gauss-Newton iteration, where the same optimization takes place as that used for a 6-degree-of-freedom camera pose, but position terms are ignored and the Jacobians are only calculated for the three rotation parameters. Re-projection errors and inaccuracies may be dealt with effectively using an M-estimator. The final 3×3 system is then solved using Cholesky decomposition.

Starting at a low resolution with only a few keypoints and a search radius of 5 pixels allows correcting gross orientation errors efficiently but does not deliver an orientation with high accuracy. The orientation is therefore refined again by matching the keypoints from the medium-resolution map (1024×512 pixels) against a half-resolution camera image (160×120 pixels). Since the orientation is now much more accurate than the original estimate, the search area is restricted to a radius of 2 pixels only. Finally, another refinement step is executed at the full resolution map against the full-resolution camera image. Each successive refinement is based on larger cells and therefore uses more keypoints than the previous refinement. In the last step several hundred keypoints are typically available for estimating a highly accurate orientation.

Re-localization is used when the tracker fail to track the keypoints and re-initialization at an arbitrary orientation is necessary. The tracker may fail, e.g., if the tracker does not find enough keypoints, or when the re-projection error after refinement is too large to trust the orientation. Re-localization is performed by storing low-resolution keyframes with their respective camera orientation in the background, as the cylindrical map is being created. In case the tracking is lost, the current camera image is compared to the stored low-resolution keyframes using normalized cross correlation. To make the matching more robust both the keyframes (once, they are stored) and the camera image are blurred. If a matching keyframe is found, an orientation refinement is started using the keyframe's orientation as a starting point.

In order to limit the memory overhead of storing low-resolution keyframes, the camera image may be down sampled to quarter resolution (80×60 pixels). Additionally, re-localization tracks the orientation already covered by a keyframe. For example, the orientation is converted into a yaw/pitch/roll representation and the three components are quantized into 12 bins for yaw (±180°), 4 bins for pitch (±30°) and 6 bins for roll (±90°). Storing only ±90° for roll is a contribution to the limited memory usage but results in not being able to recover an upside-down orientation. For each bin a unique keyframe is stored, which is only over-written if the stored keyframe is older than 20 seconds. In the described configuration, the relocalizer requires less than 1.5 MByte of memory for a full set of keyframes.

Figure 6A:
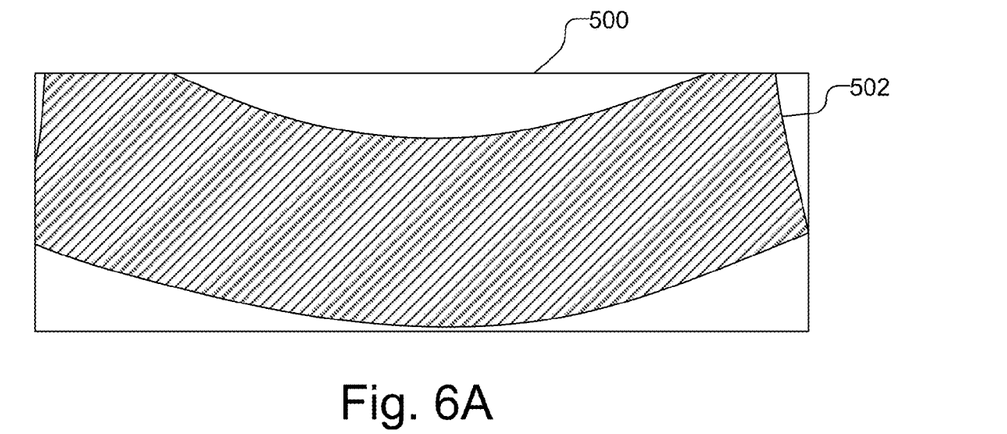
FIG. 6A illustrates an unwrapped cylindrical map that was produced after a wrong initial estimate of the pitch angle, where the shaded portion represents the mapped area.

As discussed above, the mapping process relies on an initial rough estimate of the camera orientation, e.g., pitch and roll. Starting with an incorrect initial estimate for pitch or roll violates the limits of the cylindrical environment model. FIG. 6A illustrates an unwrapped cylindrical map 500 that was produced after a wrong initial estimate of the pitch angle, where the shaded portion 502 represents the mapped area. The mapping module assumed that the initial pitch was zero, but the camera was orientated approximately 20° upwards. As can be seen, rotating the camera around the vertical axis does not result in a horizontal movement in the space of the map 510, because the vertical axis is not where the mapping module believes it to be. The effect is that the camera image quickly moves out of the map 510, which strongly limits the horizontal angle that can be mapped. Similar effects occur when the roll angle is wrongly initialized.

Figure 6B:
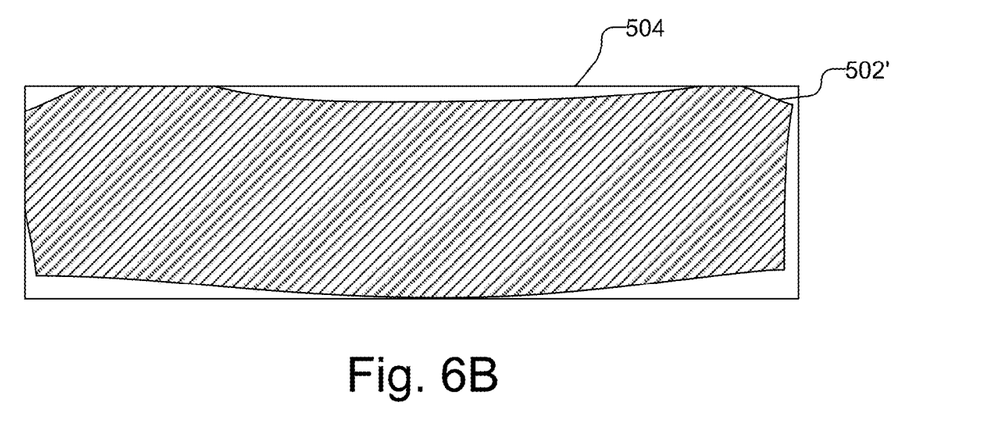
FIG. 6B is similar to FIG. 6A with the shaded portion from FIG. 6A re-projected onto a corrected unwrapped cylindrical map.

A cylindrical map that was built based on an incorrect starting orientation can be corrected by re-projecting the map portion 502' onto another cylindrical map 504, as illustrated in FIG. 6B. Re-projection may be carried out on a low-resolution map, e.g., 256×64 pixels, allowing inter-active frame rates. For example, a user can warp a preview map, e.g., by dragging the map's center on the screen into its correct position.

Figure 7:
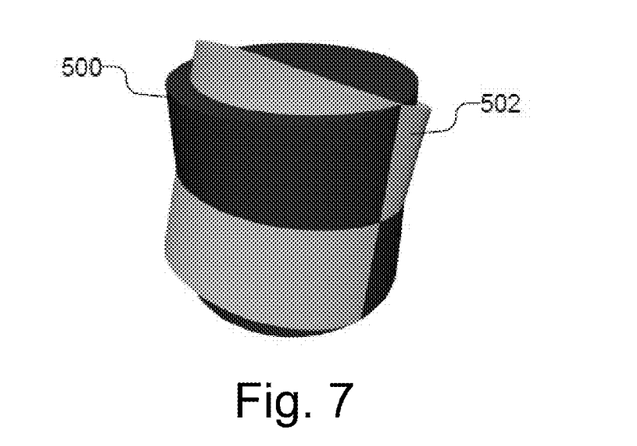
FIG. 7 illustrates a reference cylinder with respect to a rotated cylinder used for re-projection to correct for an initial incorrect estimate of mobile platform orientation.

Internally, the re-projection rotates a second cylinder 502 around the x or y-axis as illustrated in FIG. 7, accordingly to the user's input, and re-projects all pixels of the low-resolution map from the reference cylinder 500 onto the rotated cylinder 502. The result can be displayed on the screen in real time. When the user is satisfied with the correction the map may be re-projected at its full resolution. New down-sampled levels and new keypoints are extracted for all levels, so that the tracker can work with the warped map. For quality reasons a Lanczos filter may be used for resampling the map. Re-projection will produce holes in the map in those parts that were previously outside the map and have then been moved in. The user can continue to map the environment to fill these holes.

While the re-localization process described is fast, it works only for orientations where camera image samples already exist. This process is suitable for re-localization, but not for initializing from a previously existing map, a storing all camera image samples would require too much memory. Accordingly, a method for initializing the camera's orientation is provided, which relies only on a (partially) finished map that was previously created. This method is suitable for initializing the tracker after loading a map from the device's storage or, e.g., from the Internet.

Starting with a map loaded from a file, keypoints are extracted from the map and descriptors are created, e.g., using PhonySIFT, which allow robust, rotation invariant matching. Keypoints are also extracted and descriptors are created for the live camera image. While efficient search structures may be produced, such as a spill forest, these search structures may be too slow to be executed on a mobile platform. Accordingly, brute force matching may be relied upon.

Given the descriptor sets from the map and the current camera image, the orientation may be found using, e.g., RANSAC (RANdom SAmple Consensus), or other similar approaches. For example, to begin with, all camera features are matched against all map features, obtaining a set of correspondences. Next, a histogram of correspondence occurrences is created in the horizontal direction, and the direction with the largest number of correspondences in a window of 78.75° (7 cells) is selected. Following this, only correspondences that fall into this window are considered.

Since localization has three degrees of freedom, two matching features are required as a hypothesis. Pairs of two correspondences are built and an orientation is calculated, which is then validated against the other correspondences. If a large number of correspondences support this hypothesis it is checked again and the hypothesis is refined in the same manner that the orientation is updated in step 216 of FIG. 2, described above. If no orientation can be found in any possible pairs of correspondences, the whole process is repeated with the next live camera image.

Due to precision errors that accumulate as the map is extended away from its starting orientation, a full 360° sweep may not be mapped exactly at the map's edges. There may be a noticeable discontinuity at the location in the map where the left-most and right-most mapped pixels touch. Loop closing is the process of accurately estimating the error in the map and transforming the map to adjust for such error.

In order to estimate the loop error, the tracker first recognizes that is has returned to a previously visited direction. In one approach, the features in the current camera image can be compared to features in the map, or an overlapping map can be created and features can be matched within the overlapping areas. While this approach has the advantage that the current mapping method is sufficient, the approach creates the problem that the tracking could directly jump to the previously visited direction without closing the loop. Additionally, this method can only use the current camera features for loop closing.

In another approach, an extended map is used, where the map stores one data item per pixel and the extended map has overlapping areas. The map may be enlarged to cover a horizontal angle larger than 360°, e.g., by an additional angle of 45° (4 columns of cells), which is sufficient for robust loop detection. Hence, with the use of loop closing, the map covers a range of 405° (2304 pixels wide) horizontally.

Figure 8A:
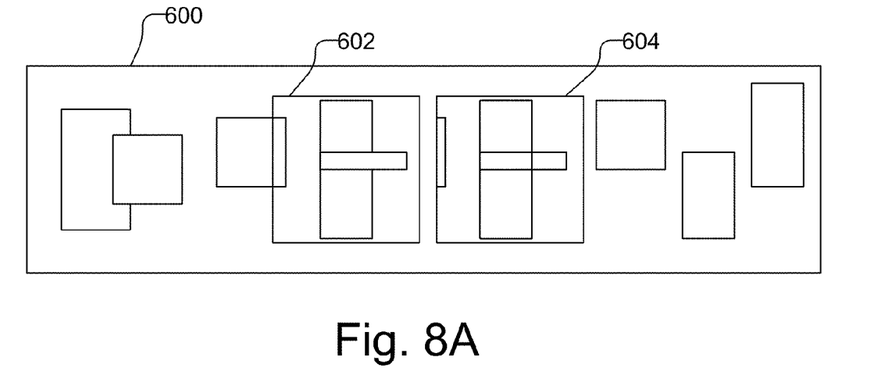
FIGS. 8A and 8B illustrate maps with overlapping regions used for loop closing.

The loop closing process begins, e.g., when only one column of cells is unfinished in the map. The completion of cells is already monitored during the regular mapping process and thus, this task does not create any overhead. To close the loop, keypoints are extracted from both overlapping regions and a robust matching process, such as RANSAC, is performed. For example, FIG. 8A illustrates a map 600 with overlapping regions 602 and 604. For each keypoint on the left region 602, the best match is found in the right region 604 using normalized cross correlation (NCC). Since loop closing is treated as a two-dimensional problem, a single match is sufficient for making a hypothesis. When a good match is found, it is checked to see how many other keypoint pairs support this hypothesis. After all hypotheses have been checked, the one with the largest inlier set is used for calculating the mapping error. In other words, the offsets between all inliers are weighted by their NCC confidence to estimate a single, highly accurate mapping error.

Figure 8B:
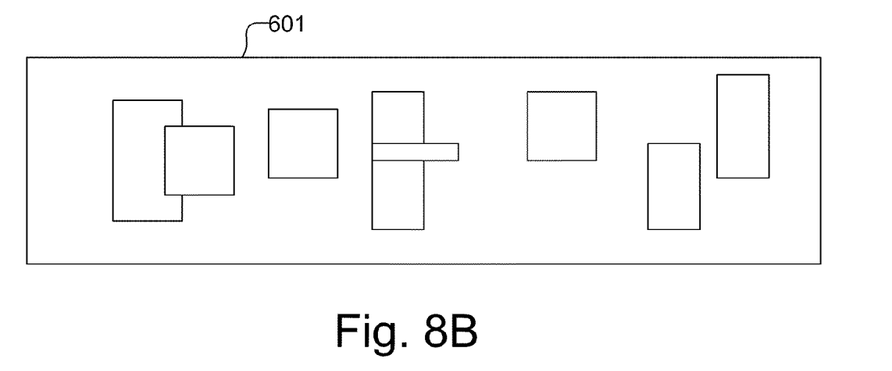

The transformation is used to align the matched keypoints in the overlapping regions 602 and 604 in such a way that the offset between keypoint pairs becomes minimal. To move keypoints horizontally to their ideal position, the map is scaled in a horizontal direction as illustrated in FIG. 8B, which illustrates corrected map 601. For vertical alignment a shear transformation may be applied using as a pivot the cell column farthest away from the gap. Both operations use Lanczos filtered sampling to minimize resampling artifacts. After the scale-shear operation, the map may be cropped to 2048 pixel width (360°) and shifted horizontally, such that the original map starting position is at the map center again. Finally, new keypoints are extracted and tracking is initialized as described above.

Figure 9:
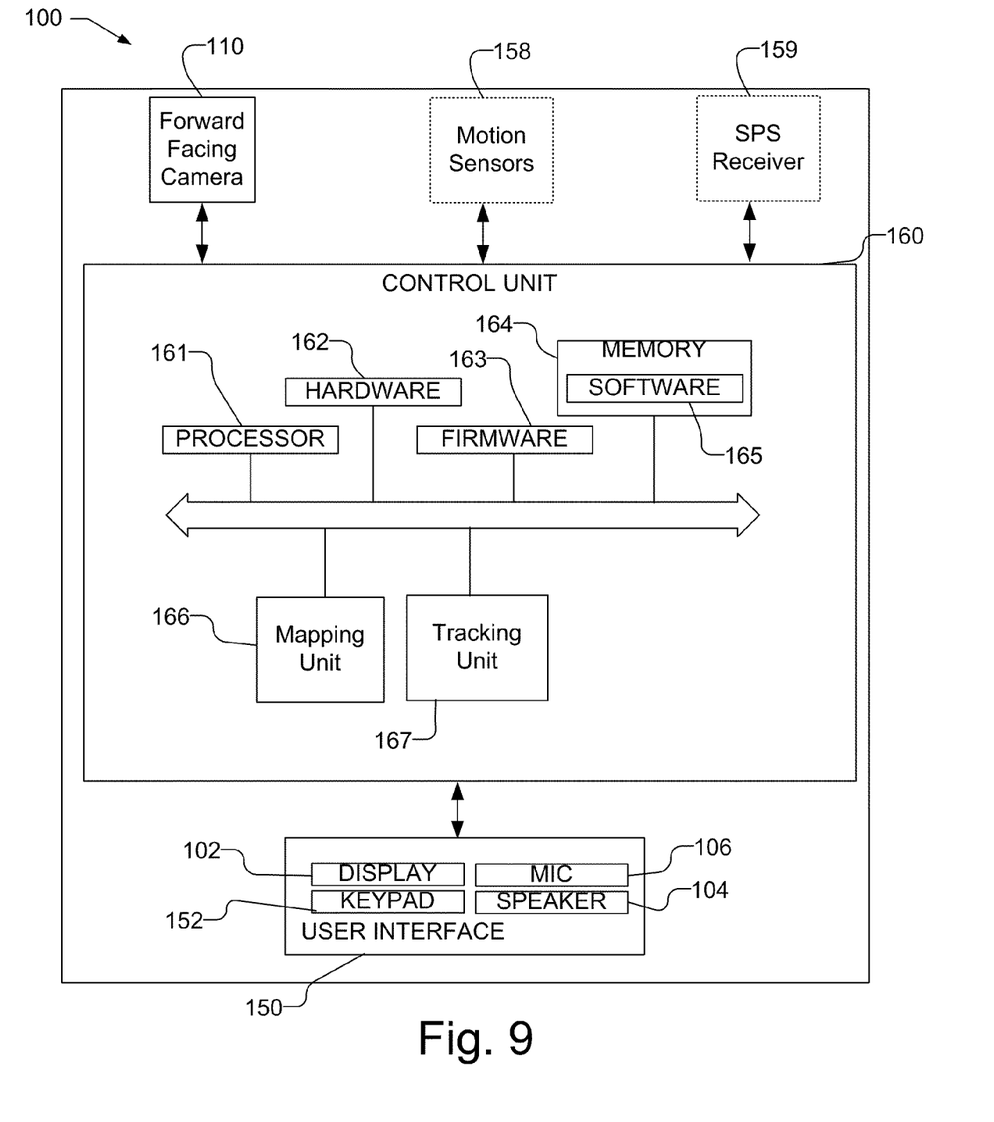
FIG. 9 is a block diagram of a mobile platform capable of real-time panoramic mapping and tracking.

FIG. 9 is a block diagram of a mobile platform 100 capable of real-time panoramic mapping and tracking. The mobile platform 100 includes the camera 110 as well as a user interface 150 that includes the display 102 capable of displaying images captured by the camera 110. The user interface 150 may also include a keypad 152 or other input device through which the user can input information into the mobile platform 100. If desired, the keypad 152 may be obviated by integrating a virtual keypad into the display 102 with a touch sensor. The user interface 150 may also include a microphone 106 and speaker 104, e.g., if the mobile platform is a cellular telephone.

The mobile platform 100 may optionally include additional features that may be helpful for AR applications, such as a motion sensor 158 including, e.g., accelerometers, gyroscopes, electronic compass, or other similar motion sensing elements, and a satellite positioning system (SPS) receiver 159 capable of receiving positioning signals from an SPS system. Of course, mobile platform 100 may include other elements unrelated to the present disclosure, such as a wireless transceiver.

The mobile platform 100 also includes a control unit 160 that is connected to and communicates with the camera 110 and user interface 150, along with other features, such as the motion sensor 158 and SPS receiver 159 if used. The control unit 160 accepts and processes data from the camera 110 and controls the display 102 in response, as discussed above. The control unit 160 may be provided by a processor 161 and associated memory 164, hardware 162, software 165, and firmware 163. The mobile platform 100 may include a mapping unit 166 for processing the images from the camera 110 and producing the cylindrical map, and a tracking unit 167 for tracking the orientation of the mobile platform with respect to the cylindrical map. The control unit 160 may further include a graphics engine 155, which may be, e.g., a gaming engine, to render desired data in the display 102, if desired. The mapping unit 166 and tracking unit 167 are illustrated separately and separate from processor 161 for clarity, but may be a single unit and/or implemented in the processor 161 based on instructions in the software 165 which is run in the processor 161. It will be understood as used herein that the processor 161, as well as one or more of the mapping unit 166 and tracking unit 167 can, but need not necessarily include, one or more microprocessors, embedded processors, controllers, application specific integrated circuits (ASICs), digital signal processors (DSPs), and the like. The term processor is intended to describe the functions implemented by the system rather than specific hardware. Moreover, as used herein the term "memory" refers to any type of computer storage medium, including long term, short term, or other memory associated with the mobile platform, and is not to be limited to any particular type of memory or number of memories, or type of media upon which memory is stored.

The methodologies described herein may be implemented by various means depending upon the application. For example, these methodologies may be implemented in hardware 162, firmware 163, software 165, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in memory 164 and executed by the processor 161. Memory may be implemented within or external to the processor 161.

If implemented in firmware and/or software, the functions may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, Flash Memory, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Figure 10:
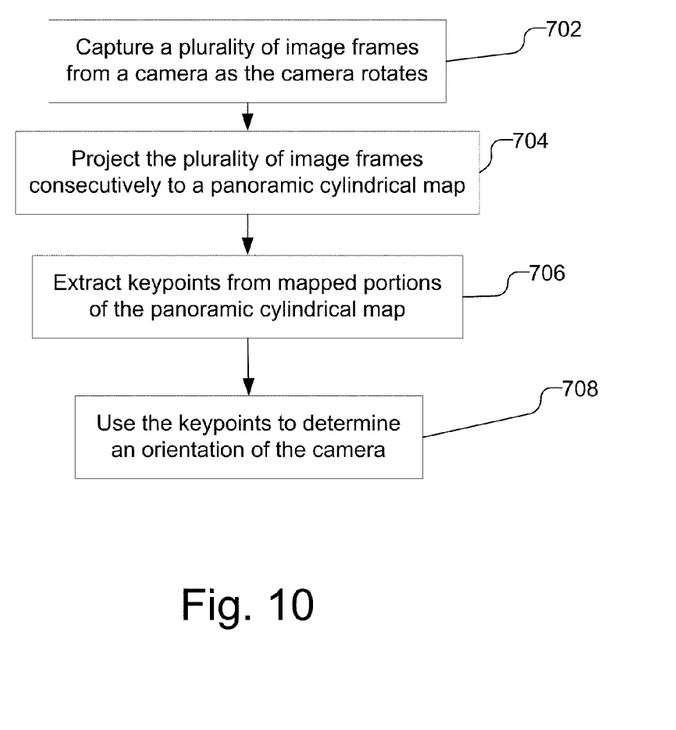
FIG. 10 is a flow chart illustrating the process of real-time panoramic mapping and tracking by mobile platform.

FIG. 10 is a flow chart illustrated the process of real-time panoramic mapping and tracking by mobile platform 100. As illustrating, a plurality of camera images are captured by a camera as the camera rotates (702). The plurality of camera images is consecutively projected onto a panoramic cylindrical map (704). The panoramic cylindrical map is extended by projecting areas of any camera image that correspond to unmapped portions of the panoramic cylindrical map (706). Thus, each pixel in the panoramic cylindrical map is filled only once. Keypoints are extracted from the mapped portions of the panoramic cylindrical map (708) and the keypoints are used to determine the orientation of the camera (710). The projecting of camera images onto the cylindrical map and the keypoint extraction and using the keypoints to determine the orientation of the camera may be performed substantially simultaneously, i.e., within one image cycle, so that both the mapping and tracking by the mobile platform occurs in together in real-time. Additionally, the process may include removing accumulated error when closing the panoramic cylindrical map by extending the panoramic cylindrical map horizontally beyond 360 degrees to produce overlapping regions and extracting and matching keypoints from the overlapping regions. Matching keypoints determines the correct alignment of the overlapping regions so that the panoramic cylindrical map may be adjusted to align the overlapping regions. An incorrect initial orientation of the panoramic cylindrical map may be corrected by determining a correct orientation in the panoramic cylindrical map and re-projecting the panoramic cylindrical map onto a different the panoramic cylindrical map having the correct orientation. The correct orientation may be determined automatically or by dragging a map center on a screen into a desired position.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

What is claimed is:

1. A method comprising:
   capturing a plurality of camera images from a camera as the camera rotates;
   projecting the plurality of camera images consecutively to a panoramic cylindrical map, wherein the panoramic cylindrical map is extended by projecting areas of any camera image that correspond to unmapped portions of the panoramic cylindrical map;
   extracting keypoints from mapped portions of the panoramic cylindrical map;
   using the keypoints to determine an orientation of the camera while capturing the plurality of camera images; and
   using the orientation of the camera to assist in the projecting the plurality of camera images consecutively to the panoramic cylindrical map.

2. The method of claim 1, wherein projecting the plurality of camera images consecutively to the panoramic cylindrical map and using the keypoints to determine the orientation of the camera are performed substantially simultaneously.

3. The method of claim 1, wherein capturing the plurality of camera images, projecting the plurality of image frames, extracting keypoints and using the keypoints is performed by a mobile platform.

4. The method of claim 1, wherein when projecting the plurality of camera images consecutively to the panoramic cylindrical map each pixel of the panoramic cylindrical map is filled not more than five times.

5. The method of claim 1, wherein when projecting the plurality of camera images consecutively to the panoramic cylindrical map each pixel of the panoramic cylindrical map is filled only once.

6. The method of claim 1, wherein using keypoints to determine the orientation of the camera comprises extracting keypoints from a captured camera image and comparing the keypoints from the captured camera image to the keypoints from the panoramic cylindrical map to determine the orientation of the camera.

7. The method of claim 1, further comprising removing accumulated error when closing the panoramic cylindrical map, wherein removing accumulated error comprises:
   extending the panoramic cylindrical map horizontally beyond 360 degrees to produce overlapping regions;
   extracting keypoints from the overlapping regions;
   matching keypoints from the overlapping regions to determine correct alignment of the overlapping regions; and
   adjusting the panoramic cylindrical map to align the overlapping regions.

8. The method of claim 1, further comprising correcting incorrect initial orientation of the panoramic cylindrical map comprising:
   determining a correct orientation in the panoramic cylindrical map; and re-projecting the panoramic cylindrical map onto a different the panoramic cylindrical map having the correct orientation.

9. The method of claim 8, wherein determining the correct orientation in the panoramic cylindrical map is performed automatically or by dragging a map center on a screen into a desired position.

10. An apparatus comprising:
a camera;
a processor connected to receive data from the camera;
memory connected to the processor;
a display connected to the memory; and
software held in the memory and run in the processor to cause the processor to consecutively project a plurality of camera images captured by the camera as the camera rotates onto a panoramic cylindrical map, wherein the panoramic cylindrical map is extended by projecting areas of any camera image that correspond to unmapped portions of the panoramic cylindrical map, extract keypoints from mapped portions of the panoramic cylindrical map, and the keypoints to determine an orientation of the camera while the plurality of camera images are captured by the camera; and use the orientation of the camera to assist in the projecting the plurality of camera images consecutively to the panoramic cylindrical map.

11. The apparatus of claim 10, wherein the software held in the memory causes the processor to project the plurality of camera images to the panoramic cylindrical map and use the keypoints to determine the orientation of the camera substantially simultaneously.

12. The apparatus of claim 10, wherein the apparatus is a mobile platform.

13. The apparatus of claim 10, wherein the software held in the memory causes the processor to project the plurality of camera images consecutively to the panoramic cylindrical map so that each pixel of the panoramic cylindrical map is filled not more than five times.

14. The apparatus of claim 10, wherein the software held in the memory causes the processor to project the plurality of camera images consecutively to the panoramic cylindrical map so that each pixel of the panoramic cylindrical map is filled only once.

15. The apparatus of claim 10, wherein the software held in the memory causes the processor to extract keypoints from a camera image captured by the camera and compare the keypoints from the camera image to the keypoints from the panoramic cylindrical map to determine the orientation of the camera.

16. The apparatus of claim 10, wherein the software held in the memory further causes the processor to extend the panoramic cylindrical map horizontally beyond 360 degrees to produce overlapping regions, extract keypoints from the overlapping regions, match keypoints from the overlapping regions to determine correct alignment of the overlapping regions, and to adjust the panoramic cylindrical map to align the overlapping regions.

17. The apparatus of claim 10, wherein the software held in the memory further causes the processor to correct an incorrect initial orientation of the panoramic cylindrical map by causing the processor to determine a correct orientation in the panoramic cylindrical map, and to re-project the panoramic cylindrical map onto a different the panoramic cylindrical map having the correct orientation.

18. The apparatus of claim 17, wherein the processor determines the correct orientation in the panoramic cylindrical map automatically or by receiving data from a touch screen coupled to the processor that indicates a map center.

19. A system comprising:
means for capturing a plurality of camera images from a rotating position;
means for projecting the plurality of camera images consecutively to a panoramic cylindrical map, wherein the panoramic cylindrical map is extended by projecting areas of any camera image that correspond to unmapped portions of the panoramic cylindrical map;
means for extracting keypoints from mapped portions of the panoramic cylindrical map;
means for using the keypoints to determine an orientation of the means for capturing the plurality of camera images while capturing the plurality of camera images; and
means for using the orientation of the camera to assist in the projecting the plurality of camera images consecutively to the panoramic cylindrical map.

20. The system of claim 19, wherein the system is a mobile platform.

21. The system of claim 19, wherein the means for projecting the plurality of camera images consecutively to the panoramic cylindrical map fills each pixel of the panoramic cylindrical map not more than five times.

22. The system of claim 19, wherein the means for projecting the plurality of camera images consecutively to the panoramic cylindrical map fills each pixel of the panoramic cylindrical map only once.

23. The system of claim 19, wherein the means for using keypoints to determine the orientation of the means for capturing the plurality of camera images comprises means for extracting keypoints from a captured camera image and means for comparing the keypoints from the captured camera image to the keypoints from the panoramic cylindrical map to determine the orientation of the means for capturing the plurality of camera images.

24. The system of claim 19, further comprising means for removing accumulated error when closing the panoramic cylindrical map, wherein the means for removing accumulated error comprises:
means for extending the panoramic cylindrical map horizontally beyond 360 degrees to produce overlapping regions;
means for extracting keypoints from the overlapping regions;
means for matching keypoints from the overlapping regions to determine correct alignment of the overlapping regions; and
means for adjusting the panoramic cylindrical map to align the overlapping regions.

25. The system of claim 19, further comprising means for correcting incorrect initial orientation of the panoramic cylindrical map comprising:
means for determining a correct orientation in the panoramic cylindrical map; and
means for re-projecting the panoramic cylindrical map onto a different the panoramic cylindrical map having the correct orientation.

26. The system of claim 25, wherein the means for determining the correct orientation in the panoramic cylindrical map comprises a touch screen display that is used to indicate a desired position for a map center.

27. A non-transitory computer-readable medium including program code stored thereon, comprising:
program code to consecutively project a plurality of camera images captured by a camera as the camera rotates onto a panoramic cylindrical map, wherein the panoramic cylindrical map is extended by projecting areas of any camera image that correspond to unmapped portions of the panoramic cylindrical map;

program code to extract keypoints from mapped portions of the panoramic cylindrical map, and program code to use the keypoints to determine an orientation of the camera while capturing the plurality of camera images; and program code to use the orientation of the camera to assist in the projecting the plurality of camera images consecutively to the panoramic cylindrical map.

28. The computer-readable medium of claim 27, further comprising program code to project the plurality of camera images consecutively to the panoramic cylindrical map so that each pixel of the panoramic cylindrical map is filled not more than five times.

29. The computer-readable medium of claim 27, further comprising program code to project the plurality of camera images consecutively to the panoramic cylindrical map so that each pixel of the panoramic cylindrical map is filled only once.

30. The computer-readable medium of claim 27, further comprising:

program code to extract keypoints from a camera image captured by the camera; and program code to compare the keypoints from the camera image to the keypoints from the panoramic cylindrical map to determine the orientation of the camera.

31. The computer-readable medium of claim 27, further comprising:

program code to extend the panoramic cylindrical map horizontally beyond 360 degrees to produce overlapping regions;

program code to extract keypoints from the overlapping regions;

program code to match keypoints from the overlapping regions to determine correct alignment of the overlapping regions; and program code to adjust the panoramic cylindrical map to align the overlapping regions.

32. The computer-readable medium of claim 27, further comprising program code to correct an incorrect initial orientation of the panoramic cylindrical map comprising:

program code to determine a correct orientation in the panoramic cylindrical map; and program code to re-project the panoramic cylindrical map onto a different the panoramic cylindrical map having the correct orientation.

33. The method of claim 1, wherein the panoramic cylindrical map has a preset height and width.

34. The method of claim 1, wherein projecting the plurality of camera images consecutively to the panoramic cylindrical map comprises:

for each new image in the plurality of camera images, detecting one or more areas of the new image that correspond to unfilled pixels in the panoramic cylindrical map; and projecting the one or more areas to fill the pixels in the panoramic cylindrical map.

35. The method of claim 1, wherein areas of any image in the plurality of camera images that correspond to areas outside the panoramic cylindrical map are not projected onto the panoramic cylindrical map.

* * * * *